(12) United States Patent
Prichett et al.

(10) Patent No.: US 7,759,288 B2
(45) Date of Patent: Jul. 20, 2010

(54) CO-FORMED BASE-TREATED ALUMINAS FOR WATER AND $CO_2$ REMOVAL

(75) Inventors: Derek Alan Prichett, Cleveland, OH (US); Roy Adolph Meikle, Kingston (CA); Timothy Christopher Golden, Allentown, PA (US); Mohammad Ali Kalbassi, Weybridge (GB); Fred William Taylor, Coplay, PA (US); Christopher James Raiswell, Crewe (GB); Jon Louis Mogan, Kemptville (CA)

(73) Assignee: Air Products and Chemicals, Inc., Allentown, PA (US)

( * ) Notice: Subject to any disclaimer, the term of this patent is extended or adjusted under 35 U.S.C. 154(b) by 893 days.

(21) Appl. No.: 11/190,547

(22) Filed: Jul. 27, 2005

(65) Prior Publication Data

US 2007/0037702 A1    Feb. 15, 2007

(51) Int. Cl.
 B01J 20/08    (2006.01)
 C01J 7/30    (2006.01)

(52) U.S. Cl. .................. 502/415; 423/625; 423/628; 502/414

(58) Field of Classification Search .......... 502/414, 502/415; 423/625, 628
See application file for complete search history.

(56) References Cited

U.S. PATENT DOCUMENTS

| | | | |
|---|---|---|---|
| 3,865,924 A | | 2/1975 | Gidaspow et al |
| 4,433,981 A | * | 2/1984 | Slaugh et al. .................. 95/139 |
| 4,755,499 A | | 7/1988 | Neal et al. |
| 4,855,276 A | | 8/1989 | Osborne et al. |
| 5,096,871 A | | 3/1992 | Lever et al. |
| 5,316,998 A | | 5/1994 | Lee et al. |
| 5,427,995 A | | 6/1995 | Ziebarth et al. |
| 5,656,064 A | | 8/1997 | Golden et al. |
| 5,917,136 A | * | 6/1999 | Gaffney et al. .................. 95/98 |
| 5,935,894 A | | 8/1999 | Kanazirev |
| 6,125,655 A | | 10/2000 | Millet et al. |

FOREIGN PATENT DOCUMENTS

| | | |
|---|---|---|
| JP | 02 043917 | 2/1990 |
| JP | 2651603 B2 | 10/1997 |
| WO | 99/59539 | 11/1999 |

OTHER PUBLICATIONS

Davidson, J. Michael, et al., "Kinetics of the Absorption of Hydrogen Sulfide by High Purity and Doped High Surface Area Zinc Oxide", Ind. Eng. Chem. Res. 1995, pp. 2981-2989, vol. 34.
Lehman, Richard L., et al., "Thermal Stability of Potassium Carbonate Near Its Melting Point", Thermochimica Acta 316, 1998 1-9.
Lang, A. A., et al., The System KOH-K2CO3-H20 At Low Temperatures, Canadian Journal of Chemistry, vol. 36, 1958, pp. 1064-1069.
Sisler, Harry H., et al., Water and Hydrogen Peroxide, College Chemistry A Systematic Approach, 2nd edition, 1961, pp. 184-185, The Macmillan Company, New York.

* cited by examiner

*Primary Examiner*—Stanley Silverman
*Assistant Examiner*—James Fiorito
(74) *Attorney, Agent, or Firm*—Willard Jones, II; Eric J. Schaal

(57) ABSTRACT

Base treated aluminas exhibit improved $CO_2$ capacity over untreated aluminas. Base treated aluminas prepared by physically mixing alumina and base during forming have (1) a higher surface area, (2) less hydrothermal aging, (3) improved $CO_2$ capacity and (4) lower cost than base treated aluminas produced by aqueous impregnation. A method for removing at least $CO_2$ and water from a gas stream includes providing an adsorbent formed from a process comprising physically mixing activated alumina solids and solid salts of alkali metals, alkaline earth metals or ammonium ion; and contacting the gas stream with the adsorbent.

17 Claims, No Drawings

CO-FORMED BASE-TREATED ALUMINAS FOR WATER AND CO₂ REMOVAL

BACKGROUND OF THE INVENTION

The present invention pertains to alumina adsorbents for removing at least water and carbon dioxide from a fluid.

In the pre-purification of air, it is desirable to remove ambient water and $CO_2$ prior to cryogenic distillation. Since water and $CO_2$ form solids at liquid air temperatures, these trace air impurities must be removed to avoid plugging in the distillation system.

Alumina is typically used as a desiccant in air pre-purification systems. Alumina has several advantages in this application including (1) low cost, (2) high volumetric water capacity, (3) simultaneous water and $CO_2$ adsorption and (4) easy description of water.

It has been found that if alumina is treated with basic salts, its $CO_2$ capacity can be increased. U.S. Pat. Nos. 5,656,064 (Golden et al.) and 6,125,655 (Millet et al.), for example, teach applying the basic salt to the alumina by an aqueous impregnation technique. Although this technique improves the $CO_2$ capacity of the alumina, the present inventors are aware of the following drawbacks associated with the technique. Firstly, the impregnation technique deposits salts in the pore structure of the alumina. This lowers the alumina surface area, which in turn lowers its water capacity. Secondly, the impregnation technique requires additional processing steps (e.g., impregnation followed by activation), which add to the complexity of manufacturing the material and increases its cost.

The formation of alumina/salt composite adsorbents by adding basic salts during the pelletizing process has been previously described. For example, U.S. Pat. No. 5,935,894 (Kanazirev) describes a method for preparing an alumina-based catalyst or adsorbent by contacting activated alumina powder with an aqueous solution of at least two different alkali metals, wherein at least one of the alkali metals is derived from a carboxylic acid alkali metal salt. During the activation process, the organic anion is decomposed, leaving a metal oxide. These materials are said to show improved $CO_2$ capacity over materials produced with just one alkali metal.

In addition to their use in air pre-purification processes, composite aluminas are known to be useful as adsorbents in other separation processes.

For example, U.S. Pat. No. 5,427,995 to Ziebarth et al. discloses an alumina adsorbent for adsorbing NOx and SOx from waste gases. The adsorbent is prepared by adding an alumina stabilizing agent (e.g., silica, rare earths, titania, zirconia and alkaline earths) to precipitated alumina, forming a slurry, milling and spray drying the slurry to form stabilized spheroidal alumina particles, and impregnating the particles with an alkali metal or alkaline earth metal to form the stabilized adsorbent.

U.S. Pat. No. 5,316,998 to Lee et al. discloses an HCl adsorbent, methods of making and using the adsorbent, wherein the adsorbent comprises an activated alumina and about 5 wt % of an alkali metal oxide promoter. The alkali metal oxide is derived from a water soluble, alkali metal salt of an organic compound which decomposes at temperatures below about 500° C.

U.S. Pat. No. 5,096,871 to Lever et al. discloses alumina-containing acid adsorbents for removing acidic materials from fluids. The adsorbents comprise activated alumina and an amorphous alkali aluminum silicate. The adsorbents are prepared by a process comprising treating activated alumina with a (preferably aqueous) solution of an alkali metal silicate followed by an alkali metal aluminate, forming agglomerates of the treated alumina at a temperature below about 90° C., aging the agglomerates at a temperature in the range of 20-90° C., and calcining the aged agglomerates at a temperature in the range of 200-500° C.

U.S. Pat. No. 4,855,276 to Osborne et al. discloses adsorbent compositions for removing compounds from gases, wherein the adsorbent compositions comprise alumina, carbon and in certain embodiments, sodium bicarbonate and impregnates such as Group 1A metal hydroxides and Group 7A salts of Group 1A metals. The compositions are prepared by a process comprising the steps of forming a mixture of activated alumina, carbon and water into a cohesive unit, and curing the cohesive unit at an elevated temperature.

U.S. Pat. No. 4,755,499 to Neal et al. discloses adsorbents comprising (a) an alumina substrate having a pore volume between 0.4 and 0.8 cc/g, and (b) an alkali or alkaline earth component, for example, sodium carbonate, wherein the amount of the alkali or alkaline earth component is between 50 and 400 µg/m² of the substrate. The adsorbents are said to be outstandingly effective for the removal of nitrogen oxides, sulfur oxides and hydrogen sulfide from waste gas streams. The patent teaches loading the alkali or alkaline earth component onto the alumina substrate by spraying the substrate with a solution of a salt of the alkali or alkaline earth component.

Despite the foregoing developments, it is desired to provide an improved process for removing water and/or $CO_2$ from a gas stream. It is further desired to provide an improved adsorbent and an improved apparatus for use in such a process.

All references cited herein are incorporated herein by reference in their entireties.

BRIEF SUMMARY OF THE INVENTION

Accordingly, the invention provides an adsorbent comprising activated alumina and a salt of a member selected from the group consisting of alkali metals, alkaline earth metals and ammonium ion, said adsorbent provided by a process comprising the steps of: (a) activating aluminum hydrate to provide activated alumina powder; (b) pelletizing the activated alumina powder with the salt to provide activated alumina pellets; (c) aging the activated alumina pellets to provide aged pellets; and (d) reactivating the aged pellets to provide the adsorbent, wherein the process is conducted without adding an aqueous mixture of promoter solids to the activated alumina.

A process for preparing the adsorbent of the invention is also provided. The process comprises the steps of: (a) activating aluminum hydrate to provide activated alumina powder; (b) pelletizing the activated alumina powder with the salt to provide activated alumina pellets; (c) aging the activated alumina pellets to provide aged pellets; and (d) reactivating the aged pellets to provide the adsorbent, wherein the process is conducted without adding an aqueous mixture of promoter solids to the activated alumina.

Further provided is a method for removing at least $CO_2$ and water from a gas stream, said method comprising contacting the gas stream with the inventive adsorbent for a duration effective to remove at least $CO_2$ and water from the gas stream.

Still further provided is an apparatus for performing the method of removing at least $CO_2$ and water from a gas stream, said apparatus comprising: (a) a gas stream source containing a gaseous mixture comprising $CO_2$ and water; (b) a chamber containing the adsorbent; (c) a feed conduit for conveying the gas stream from the gas stream source to the chamber; and (d) a product conduit adapted to convey a purified gas stream out of the chamber after $CO_2$ and water have been adsorbed from the gas stream by the composite adsorbent.

DETAILED DESCRIPTION OF THE INVENTION

The invention is based on our discovery that the method of formation of an alumina/metal salt composite adsorbent has a significant effect on its performance for the removal of $CO_2$ and water from gas streams.

Conventional methods for forming activated alumina adsorbents have generally consisted of the four following steps.

Step 1. Activation: Aluminum hydrate is converted into aluminum oxide by activation at temperatures up to 1000° C. This process produces fine particle, porous aluminum oxide powder (typically 1 to 100 microns), which must be formed into larger particle sizes to make useful, activated alumina particles for fixed bed applications.

Step 2. Pelletizing: The activated alumina powder formed in step 1 is added with water in a pelletizing machine to produced formed activated alumina particles (or pellets), typically spheres, of 0.5 to 5 mm in diameter.

Step 3. Aging: The formed pellets are aged at up to 100° C. and 100% RH for up to 12 hours to impart strength to the finished product.

Step 4. Reactivation: The formed pellets are then heated at temperatures from 100 to 500° C. to produce a final product with a low residual water content and high adsorption capacity.

In conventional processes for adding $CO_2/H_2O$ promoters (or additives) to the activated alumina, the promoters have been added by spray impregnation of the final formed activated alumina product with aqueous solutions of the desired promoter. Such aqueous impregnation techniques require the extra production steps of spray impregnation and a final reactivation.

The preferred adsorbent preparation process of the present invention (sometimes described herein as "co-formation") comprises the addition of solid salts of alkali metals, alkaline earth metals and/or ammonium ion to the activated alumina powder during the pelletization step. The solid salts and activated alumina powder are physically mixed in the pelletizing step to form composite pellets. Production via physical mixture (which as defined herein means combining and mixing at least two different solids, optionally in the presence of a liquid) has several advantages over the aqueous impregnation approach. Firstly, production of the adsorbent involves fewer synthesis steps, which results in a lower cost adsorbent. Secondly, the adsorbent has a higher surface area and water capacity than a material produced by spray impregnation of formed alumina beads.

In addition, we unexpectedly found the following surprising benefits associated with the adsorbent of the invention: 1) the $CO_2$ capacity of the adsorbent of the invention was higher than that of the impregnated material at the same salt loading; and 2) the adsorbent of the invention had higher hydrothermal stability compared to the impregnated material.

Thus, a first aspect of the invention comprises a process for providing the adsorbent of the invention. The adsorbent providing process preferably includes modified versions of the four steps, discussed above, which are employed to produce conventional activated alumina adsorbents.

The first step is the activation step. Conventional means for providing activated alumina particles are suitable for use in the inventive process, but the invention is not limited thereto.

Thus, for example, aluminum hydrate can be converted into aluminum oxide by activation at temperatures up to 1000° C. Preferably, the activated alumina particles (or solids) range in diameter from 0.5 to 100 microns.

The second step is the pellitizing step. This step is modified from conventional pellitizing in that it includes the addition of promoter solids to the activated alumina from the first step. The promoter solids are preferably alkali metal salts, alkaline earth metal salts or an ammonium ion salt, with alkali metal salts being most preferred. The salts are preferably carbonates, bicarbonates or phosphates, more preferably carbonates, bicarbonates or phosphates of lithium, sodium or potassium, and even more preferably comprise at least one member selected from the group consisting of alkali metal carbonates, alkali metal bicarbonates and alkali metal phosphates. Most preferably, the salt is potassium carbonate. The promoter solids are preferably loaded onto the activated alumina in an amount from 0.5 to 10 wt % based on the weight of the composite metal salt/alumina material.

Contrary to the teachings of U.S. Pat. No. 6,125,655, it is not preferred to post-treat the final activated product with compounds and conditions that promote the formation of alkali metal oxides. Accordingly, preferred embodiments of the invention exclude alkali metal oxides, alkaline earth metal oxides and/or oxides of ammonium ion from the adsorbent. In certain of these embodiments, alumina is the only metal oxide in the adsorbent.

One or more promoters can be added to the activated alumina to form the adsorbent of the invention; however, in certain embodiments, it is considered advantageous to mix only one salt (e.g., alkali metal salt, alkaline earth metal salt or ammonium ion salt) with the activated alumina solid. In certain of these embodiments, only one alkali metal salt solid is added to the activated alumina solid, such that the adsorbent comprises only one alkali metal salt.

The combined solids are physically mixed during the pelletizing step. Pelletizing is preferably conducted in a pelletizing machine to produce composite pellets, typically spheres, of 0.5 to 5 mm in diameter.

It is within the scope of the invention to add water to the mixture of solids for the purpose of binding small alumina particles together to form larger alumina particles, so long as aqueous impregnation of the activated alumina solids is not achieved. However, the water is substantially free of any promoter solids. The water is deemed to be substantially free of promoter solids provided that the water as applied to the alumina particles contains less than 0.1 wt. % promoter solids. Thus, in preferred embodiments of the invention, the entire process is conducted without adding an aqueous mixture (i.e., solution, dispersion, etc.) of promoter solids to the activated alumina.

The amount of water added in the pelletizing step is also a distinguishing feature of certain embodiments of the invention. Preferred embodiments of the present invention include the use of more than 0.27 liters of water per kg of solids, and more preferably at least 0.4 liters/kg.

The third step is the aging step. The aging step is not particularly limited and can be conducted, for example, under conventional conditions. Thus, the composite pellets from second step are preferably aged at up to 100° C. and 100% RH for up to 12 hours to impart strength to the finished product.

The fourth step is the reactivation step. The reactivation step is not particularly limited and can be conducted, for example, under conventional conditions. Thus, the aged pellets from the third step are preferably heated at temperatures from 100 to 500° C. to produce the adsorbent of the invention. The adsorbent preferably comprises beads ranging in diameter from 0.3 to 5 mm. However, it is also within the scope of the invention to provide the composite adsorbent in the form of an extrudate or sphere.

In addition to the adsorbent preparation and gas stream treatment aspects of the present invention described above, the invention comprises adsorbents prepared by the process of the invention and used in the treatment of the invention. The adsorbent has a preferred surface area of at least 250 m$^2$/g, more preferably at least 280 m$^2$/g.

In preferred embodiments, the water capacity of the adsorbent is substantially undiminished relative to a reference water capacity of the activated alumina solids. As shown in Example 2, below, the water capacity of the (co-formed) adsorbent was only 0.1 wt % less than that of the reference activated alumina. The expression "substantially undiminished" as used herein means that the water capacity is reduced by not more than 0.5 wt % relative to the reference alumina. In absolute terms, it is preferred that the adsorbent have a water capacity of at least 14 wt % at 25° C. and 60% RH.

It is further preferred that the adsorbent have a $CO_2$ capacity higher than a reference $CO_2$ capacity of a corresponding impregnated adsorbent. See, e.g., Example 1, below.

It is still further preferred that the adsorbent have a hydrothermal stability higher than a reference hydrothermal stability of a corresponding impregnated adsorbent. See, e.g., Example 3, below.

In another aspect of the invention, the adsorbent is used in a process for removing at least $CO_2$ and water from a gas stream. Other components of the gas stream, such as, e.g., nitrogen oxides, sulfur oxides, hydrogen sulfide, ammonia and other acid gases, can also be removed in certain embodiments. Suitable gas streams for use in the inventive process should contain $CO_2$ and water, and include, e.g., air, synthesis gas and natural gas.

Preferred process conditions included an adsorption temperature from 0 to 50° C., and an adsorption pressure from 1.5 to 50 bar absolute. The process is preferably conducted under temperature swing adsorption conditions or pressure swing adsorption conditions.

In another aspect of the invention, an apparatus for performing the inventive process is provided. The apparatus preferably includes: (a) a gas stream source containing a gaseous mixture comprising $CO_2$ and water; (b) a chamber containing the adsorbent; (c) a feed conduit for conveying the gas stream from the gas stream source to the chamber; and (d) a product conduit adapted to convey a purified gas stream out of the chamber after $CO_2$ and water have been adsorbed from the gas stream by the adsorbent.

The adsorbent can be used as the sole adsorbent in the adsorption chamber. The key advantage of using a single adsorbent is that there are no adsorbent layers to intermix in the event of a bed disturbance (fluidization). The use of the adsorbent as a sole material in the adsorption chamber is for applications including water and carbon dioxide removal from synthesis gas (mixtures of carbon monoxide and hydrogen) and natural gas. The adsorbent can also be used in conjunction with other adsorbents. For example, in the case of air pre-purification, the adsorbent can be placed on the feed end of the adsorption chamber to remove water and carbon dioxide. Downstream of the adsorbents typically are zeolites, which further remove other air impurities like nitrous oxide, hydrocarbons and carbon dioxide that breaks through the adsorbent.

EXAMPLES

The invention will be illustrated in more detail with reference to the following Examples, but it should be understood that the present invention is not deemed to be limited thereto.

Example 1

The $CO_2$ capacity of various alumina-based adsorbents was tested by measuring $CO_2$ breakthrough curves at 25° C. with 100 psig feed air containing 400 ppm $CO_2$. The samples were regenerated in 150° C. $N_2$ prior to adsorption measurements. The results in Table 1 represent the $CO_2$ capacity after 3 adsorption/regeneration cycles. The base alumina was AA-300 from Alcan. Samples produced by aqueous impregnation were prepared by adding sufficient solution to just fill the pore volume of the formed alumina (8×14 mesh), the concentration of the solution being such as to produce various weight per cent (solute/total weight of solids) loading of the solute on the alumina after drying at 120° C. In the case of the co-formed products, the solid basic salt was added to powdered activated alumina (about 10 microns) in the right proportions to give the desired metal salt loading. The mixture of salt and alumina powder was prepared in a laboratory pelletizer and water was added as needed to form 8×14 mesh beads. The pellets were aged for 8 hours at 90° C. and calcined at 400° C. for 2 hours. The results of the $CO_2$ capacity measurements are shown in Table 1. In all cases, the solute employed was $K_2CO_3$.

TABLE 1

| Sample | Relative $CO_2$ capacity |
| --- | --- |
| AA-300 alumina | 1.0 |
| 5 wt % $K_2CO_3$ impregnation | 1.55 |
| 8 wt % $K_2CO_3$ impregnation | 2.11 |
| 8 wt % $K_2CO_3$ co-formed | 2.67 |

The results in Table 1 clearly show that addition of $K_2CO_3$ to alumina improves its $CO_2$ capacity. The unobvious result is that the $CO_2$ capacity is a strong function of the method of manufacture of the adsorbent. Addition of 8 wt % $K_2CO_3$ to a formed alumina by aqueous impregnation produced a material with 2.1 times the $CO_2$ capacity of the base alumina. However, when the $K_2CO_3$ was added prior to the forming step, the $CO_2$ capacity increase was about 2.7 times. The co-formation production method improved the $CO_2$ capacity 25% over the conventional aqueous impregnation technique.

Example 2

Some of the samples from Example 1 were tested for $N_2$ BET surface area and water capacity at 25° C. and 60% RH. The results of these measurements are shown in Table 2.

TABLE 2

| Sample | BET surface area (m$^2$/g) | Water capacity @ 25° C., 60% RH (wt %) |
| --- | --- | --- |
| AA-300 | 311 | 16.0 |
| 8 wt % impregnation | 242 | 14.7 |
| 8 wt % co-formed | 286 | 15.9 |

The results in Table 2 show that incorporation of $K_2CO_3$ at an 8-weight % level reduces the surface area of the base alumina. However, adding the $K_2CO_3$ by aqueous impregnation reduces the alumina surface area more than if the $K_2CO_3$ is introduced by the co-formation technique. Impregnation results in a 22% drop in surface area, while the co-formation process results in an 8% loss in surface area. Another key aspect of the co-formation technique is its effect on the water capacity of the alumina. Aqueous impregnation to 8 wt % $K_2CO_3$ results in a loss in water capacity of the alumina at 60% RH of 8%. Adding 8 wt % $K_2CO_3$ using the co-formation technique results in no change in the water capacity of the material. This is particularly important since a key utility of the alumina in this process is water removal. U.S. Pat. No. 6,125,655 shows that adding alkali metal oxides to alumina improves its $CO_2$ capacity. However, the results in the '655 patent also show that addition of the metal oxides reduces the water capacity of the material from 5 to 16% (FIGS. 3, 4 and 5). This example shows that the co-formation process does not substantially affect the water capacity of the formed alumina product.

Example 3

It is well known in the prior art that alumina desiccants lose water adsorption performance over time due to hydrothermal aging (see, e.g., U.S. Pat. No. 5,968,234 to Midgett et al.). During thermal regeneration of the wet alumina, steam is generated which slowly converts the aluminum oxide to aluminum hydroxide. This chemical conversion results in a loss of surface area of the alumina with a concomitant loss in water capacity.

We have found that formation of base modified alumina by the co-formation process improves the hydrothermal stability of the alumina relative to the as-formed alumina and the base-modified alumina produced by aqueous impregnation on the formed alumina piece. The results in Table 3 show the surface area (SA) of as-received alumina, 8 wt % $K_2CO_3$ alumina formed by aqueous impregnation and 8 wt % $K_2CO_3$ formed via co-formation after treating in steam at 250° C. for various lengths of time. The values in parentheses represent the loss in surface area relative to fresh material prior to steaming.

TABLE 3

| Sample | SA as-received ($m^2/g$) | SA after 4 hrs steam ($m^2/g$) | SA after 8 hrs steam ($m^2/g$) |
|---|---|---|---|
| AA-300 | 311 | 225 (−28%) | 178 (−43%) |
| 8% $K_2CO_3$ impregnation | 246 | 202 (−18%) | 162 (−34%) |
| 8% $K_2CO_3$ co-formed | 286 | 262 (−8%) | 208 (−27%) |

The results in Table 3 clearly show that incorporation of $K_2CO_3$ onto the alumina helps retard the aging process. The results also show that the method of formation of the base-modified material also impacts its ability to withstand hydrothermal aging. The $K_2CO_3$ loaded material produced by aqueous impregnation on the formed alumina lost 18 and 34% of its surface area following 4 and 8 hours of steaming, respectively. The adsorbent produced by co-formation was the most resistant to hydrothermal aging, showing surface area losses of 8 and 27% following steaming times of 4 and 8 hours, respectively. The results in Table 3 show that: (1) base incorporation into alumina retards hydrothermal aging; and (2) production of base-modified alumina by a co-formation process improves the hydrothermal stability over the aqueous impregnation production technique.

Example 4

Bound alumina bodies were formed by adding 55 liters of water to 100 kg of activated alumina powder (92 kg) and potassium carbonate (8 kg). The mixture was then formed into beads ranging in size from 4 to 12 mesh. The beads were aged for 8 hours at 90° C. and calcined at 400° C. for 2 hours. Following calcinations, some formed beads of 6 mesh size were tested for crush strength in a Chatillon compression test unit. The average crush strength measured for 50 beads was 22 lbs. This is significantly higher than the crush strength of a composition in accordance with U.S. Pat. No. 5,935,894, which employed a water/solid ratio of 0.27 liters of water/kg of solid in Example 1 to obtain a composition having a crush strength of only 14 lbs. The current example used a water to solid ratio of 0.55 liters/kg.

While the invention has been described in detail and with reference to specific examples thereof, it will be apparent to one skilled in the art that various changes and modifications can be made therein without departing from the spirit and scope thereof.

The invention claimed is:

1. An adsorbent comprising activated alumina and a salt, said adsorbent provided by a process comprising the steps of:
   activating aluminum hydrate to provide activated alumina powder;
   pelletizing the activated alumina powder with the salt to provide activated alumina pellets, wherein the salt is an alkali metal carbonate;
   aging the activated alumina pellets to provide aged pellets; and
   reactivating the aged pellets to provide the adsorbent,
   wherein the process is conducted without adding an aqueous mixture of promoter solids to the activated alumina powder, the pelletizing step comprises physically mixing the activated alumina powder and the salt with at least 0.4 liter of water per kg of solids, and the adsorbent has a surface area of at least 280 $m^2/q$.

2. The adsorbent of claim 1, wherein the salt is potassium carbonate.

3. The adsorbent of claim 1, wherein the adsorbent comprises only one salt.

4. The adsorbent of claim 1, wherein the adsorbent is free of oxides of alkali metals, alkaline earth metals and ammonium ion.

5. The adsorbent of claim 1, wherein the salt constitutes from 0.5 to 10 wt. % of the adsorbent.

6. The adsorbent of claim 1, in a form of beads ranging in diameter from 0.3 mm to 5 mm.

7. The adsorbent of claim 1, in a form of an extrudate or a sphere.

8. The adsorbent of claim 1, having a water capacity substantially undiminished relative to a reference water capacity of the activated alumina powder.

9. The adsorbent of claim 1, having a water capacity of at least 14 wt % at 25° C. and 60% RH.

10. The adsorbent of claim 1, wherein the process is conducted without aqueous impregnation of the activated alumina.

11. A process for preparing the adsorbent of claim 1, said process comprising the steps of:
   activating aluminum hydrate to provide activated alumina powder;
   pelletizing the activated alumina powder with the salt to provide activated alumina pellets;
   aging the activated alumina pellets to provide aged pellets; and
   reactivating the aged pellets to provide the adsorbent,
   wherein the process is conducted without adding an aqueous mixture of promoter solids to the activated alumina powder, the pelletizing step comprises physically mixing the activated alumina powder and the salt with at least 0.4 liter of water per kg of solids, and the adsorbent has a surface area of at least 280 m²/g.

12. The process of claim 11, wherein the activating step comprises heating aluminum hydrate to a temperature as high as 1000° C.

13. The process of claim 11, wherein particles of the activated alumina powder range in diameter from 0.5 to 100 microns.

14. The process of claim 11, wherein all water used in the process is substantially free of promoter solids prior to mixing with the activated alumina powder and the salt in the pelletizing step.

15. The process of claim 11, wherein the aging step comprises heating the activated alumina pellets at a temperature of up to 100° C. and a relative humidity of up to 100% for up to 12 hours.

16. The process of claim 11, wherein the reactivating step comprises heating the aged pellets to a temperature from 100 to 500° C.

17. The process of claim 11, wherein the process is conducted without aqueous impregnation of the activated alumina.

* * * * *

UNITED STATES PATENT AND TRADEMARK OFFICE
CERTIFICATE OF CORRECTION

PATENT NO.         : 7,759,288 B2
APPLICATION NO.    : 11/190547
DATED              : July 20, 2010
INVENTOR(S)        : Derek Alan Prichett et al.

It is certified that error appears in the above-identified patent and that said Letters Patent is hereby corrected as shown below:

Column 8, Line 33

In claim 1 delete "$m^2/q$" and insert -- $m^2/g$ --

Signed and Sealed this

Fourteenth Day of September, 2010

David J. Kappos
*Director of the United States Patent and Trademark Office*